United States Patent [19]
Shreeve et al.

[11] Patent Number: 5,520,327
[45] Date of Patent: May 28, 1996

[54] ELECTRONIC THERMOSTAT HAVING SAFETY FEATURE

[75] Inventors: William O. Shreeve, Huntington; Thomas W. Essig, Ft. Wayne, both of Ind.

[73] Assignee: Carrier Corporation, Syracuse, N.Y.

[21] Appl. No.: 311,231

[22] Filed: Sep. 23, 1994

[51] Int. Cl.$^6$ .............................. A21B 1/00; F25B 29/00
[52] U.S. Cl. .............................. 236/10; 62/126; 165/26; 236/21 R; 236/78 R; 219/413
[58] Field of Search .................................. 236/11, 46 R, 236/78 R, 10, 21 R; 361/103; 165/26; 62/126; 219/413–11

[56] References Cited

U.S. PATENT DOCUMENTS

| | | | |
|---|---|---|---|
| 3,973,727 | 8/1976 | Scalzo et al. | 236/11 |
| 5,307,990 | 5/1994 | Adams et al. | 236/11 |
| 5,377,909 | 1/1995 | Kirkpatrick | 236/11 |

*Primary Examiner*—William E. Wayner

[57] ABSTRACT

An electronic thermostat having a safety feature includes a controller which sends control signals to circuitry used for activating a system for conditioning air. The control signals are used to control the active state of the system for conditioning air. Furthermore, safety cutoff circuitry is incorporated into the thermostat whereby the safety cutoff circuitry is used to override the control signal sent from the controller when a predetermined temperature is reached in the space being heated or cooled.

11 Claims, 1 Drawing Sheet

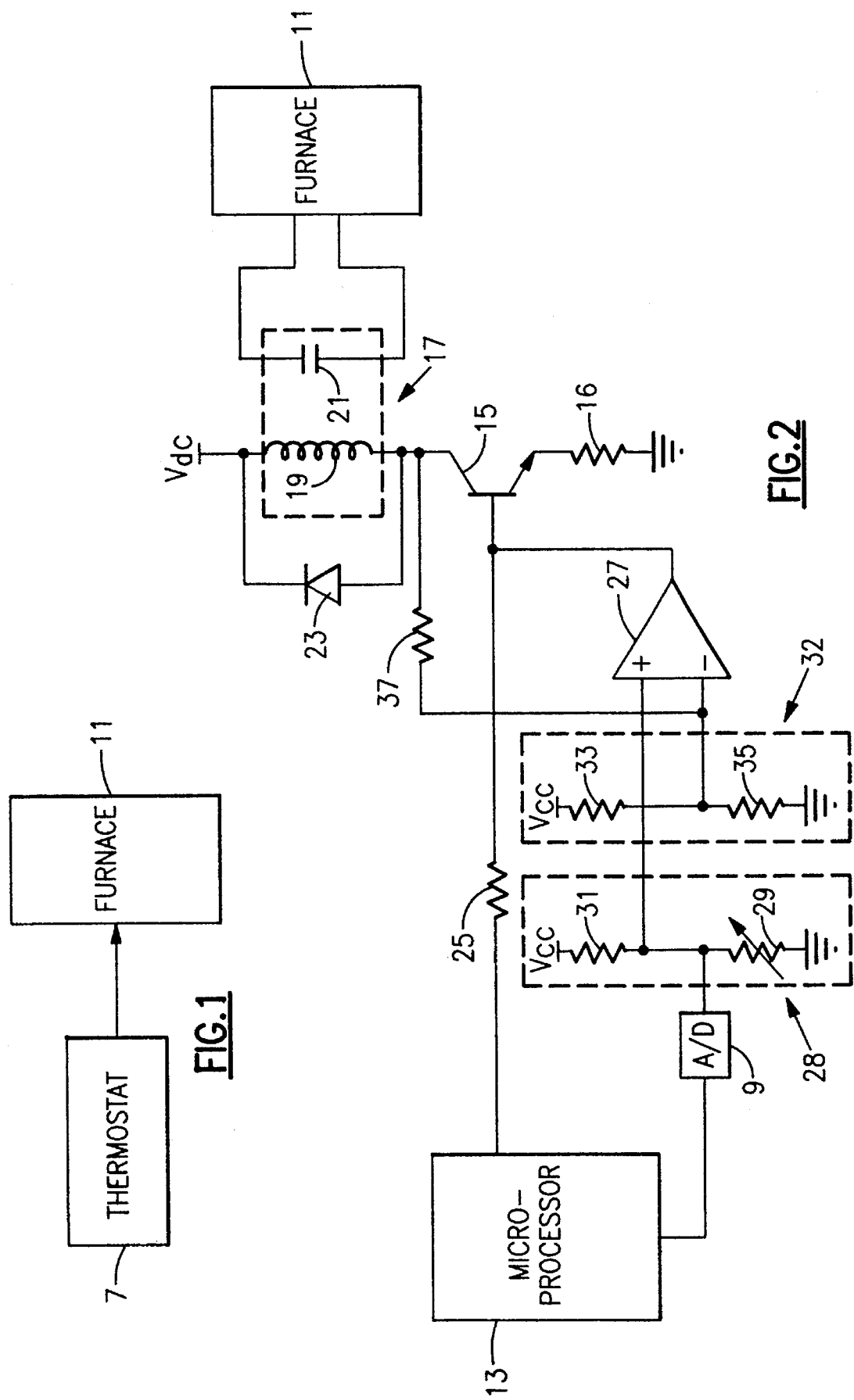

5,520,327

ELECTRONIC THERMOSTAT HAVING SAFETY FEATURE

BACKGROUND OF THE INVENTION

This invention relates to an electronic thermostat having a controller for normally controlling the activation of a heating or cooling system. In particular this invention relates to the deactivation of the heating or cooling system when the controller malfunctions.

Heating, ventilation and air conditioning (HVAC) systems are commonly used in homes and commercial establishments to provide temperature controlled environments. Generally, a thermostat is used to manually set a desired temperature for an area heated or cooled by the HVAC system. The thermostat includes a controller which cooperates with a temperature sensor that senses the temperature of the area being heated or cooled. If the temperature has deviated from the desired temperature set on the thermostat, the controller will send a signal which will turn on the HVAC system.

In many instances the controller will be a microprocessor that receives signals from the temperature sensor and electronically controls the operating state of the HVAC system. However, these microprocessors do not always operate perfectly and field conditions may occasionally cause the microprocessor to malfunction. Thus, if a microprocessor controlling a furnace accidently locks up in a state which leaves the furnace on, the area serviced by this furnace can reach extremely high temperatures. Such extreme temperatures can cause damage to plants, pets, and others in the area who may not be able to turn power off to the furnace for whatever reason. Therefore, it is essential to have an accurate and reliable safety cutoff mechanism to protect against such controller lock up situations. One method used to protect against controller lock up situations is to place a bimetallic temperature switch at the output of a relay which controls the on/off state of the HVAC system. When this mechanical safety switch heats up to a certain temperature range, it will send a signal cutting off power to the HVAC system. However, given the mechanical characteristics of the bimetallic temperature switch, this safety device is not always reliable and may fail to work in some instances. In addition, under normal working conditions, the bimetallic temperature switch has a tolerance of approximately plus or minus ten degrees Fahrenheit from the temperature at which it should be activated. Having such a large tolerance in the safety device can be dangerous since it may not allow power to be cutoff to the HVAC system at a safe temperature. Also, this bimetallic temperature switch is expensive to use.

SUMMARY OF THE PRESENT INVENTION

It is an object of this invention to provide an electronic thermostat having an accurate and reliable safety cutoff feature at minimal added cost.

According to the present invention, an electronic thermostat having a controller which sends a control signal to circuitry for activating a system for conditioning air furthermore includes safety cutoff circuitry which will override the control signal when a certain temperature condition occurs in the space being heated or cooled by the system for conditioning air.

The safety cutoff circuitry preferably includes shunting circuitry connected to a line carrying the control signal from the controller. Additionally, the shunting circuitry preferably has temperature responsive circuitry connected to it which produces a signal that is compared with a threshold voltage level. The threshold voltage level is created by reference voltage circuitry and represents a preset reference temperature. The signal produced by the temperature responsive circuitry is indicative of the temperature in the space being heated or cooled by the system for conditioning air and when this signal passes through the threshold voltage level, the shunting circuitry will shunt the control signal sent from the controller.

The shunting circuitry also preferably includes a feedback loop connecting the circuitry for activating the system for conditioning air to the reference voltage circuitry. This feedback loop will serve to change the value of the threshold voltage level following the shunting of the control signal which helps stabilize the output of the shunting circuitry.

Additional objects and features of the invention will be apparent from consideration of the detailed description of the invention taken together with the accompanying drawings, in which:

BRIEF DESCRIPTION OF THE DRAWINGS

FIG. 1 is a block diagram showing a thermostat connected to a furnace.

FIG. 2 is a circuit diagram for the electronic thermostat of FIG. 1 connected to a furnace.

DESCRIPTION OF THE PREFERRED EMBODIMENT

Referring to FIG. 1, a furnace 11 is shown to be controlled by a thermostat 7 which is used to set a desired temperature in an area (not shown) being heated by the furnace. As shown in FIG. 2, the thermostat includes a microprocessor 13 which receives a signal from temperature responsive circuitry 28 through an analog to digital converter 9. The converted signal received by the microprocessor is then used to control the active state of the furnace by determining whether the area being heated by the furnace has deviated from the desired temperature. Additionally, the thermostat is shown to have a relay 17, connected to a switching transistor 15, which is controlled by the microprocessor.

The relay 17 consists of a relay contact 21 and a relay coil 19. The ends of the relay contact 21 attach to the furnace 11 and determine the active state of the furnace. The relay coil is connected at one end to a voltage $V_{dc}$, and on the other end to the collector of the transistor 15. In addition, a diode 23 is connected in parallel with the relay coil 19 and serves to protect the transistor from the large positive voltage produced by the relay coil when the transistor switches off. However when the transistor 15 is on, the relay coil produces a magnetic field across the relay contact which in turn closes the relay contact and turns the furnace 11 on.

As shown in FIG. 2, the transistor 15 has its emitter connected to ground through a resistor 16 and a base connected to the microprocessor 13 through a resistor 25. Thus, when the analog to digital converter 9 indicates to the microprocessor that the temperature in the area being heated by the furnace is lower then the temperature set at the thermostat 7, the microprocessor will send a control signal to the base of the transistor 15 which will bias it on. This is done by producing a voltage level at the base of the transistor greater then approximately seven tenths of a volt (the amount needed to overcome the forward diode drop between the base and the emitter).

A comparator 27 has an open collector output connected to the base of the transistor 15 and is used as a shunting mechanism for control signals sent by the microprocessor 13. The positive input terminal of the comparator is connected to the temperature responsive circuitry 28 which creates a voltage potential at the positive input. The temperature responsive circuitry consists of a thermal resistor 29 connected between the positive input terminal and ground, and a resistor 31 connected between the positive input terminal and a voltage $V_{cc}$. This configuration acts as a voltage divider which creates a voltage potential on the positive input terminal of the comparator equal to $V_{cc}*(R_{29}/(R_{29}+R_{31}))$, wherein $R_{29}$ equals the variable resistance of the thermal resistor 29 and $R_{31}$ equals the resistance of the resistor 31.

The negative terminal of the comparator 27 is connected to the reference temperature circuitry 32 which consists of a resistor 33 and a resistor 35. The resistor 33 connects between the negative input terminal and the voltage $V_{cc}$ while the resistor 35 connects between the negative input terminal and ground. This reference temperature circuitry serves to set up a reference voltage on the negative input of the comparator which is approximately equal to $V_{cc}*(R_{35}/(R_{35}+R_{33}))$, wherein $R_{33}$ equals the resistance of the resistor 33 and $R_{35}$ equals the resistance of the resistor 35. The voltage level on the negative input terminal is set such that it is indicative of the temperature at which the comparator will be used to override the microprocessor control signal. Thus, when the voltage level on the positive input of the comparator passes through the voltage level on the negative input, the output of the comparator will go low. The low voltage condition at the output of the comparator acts as a shunt to the control signal from the microprocessor and serves to turn off the transistor 15 regardless of the voltage level of the control signal.

As shown in FIG. 2, a resistor 37 is used to create a feedback loop between the negative terminal of the comparator 27 and the collector of the transistor 15. This feedback loop is used to provide hysteresis which helps stabilize the comparator's output after it initially triggers so that small fluctuations at the positive input terminal of the comparator will not cause repeated triggering. Additionally, the hysteresis causes the voltage level on the negative input of the comparator to raise an amount proportional to one or two degrees Fahrenheit, thereby ensuring the furnace does not reactivate again until the area being heated has cooled to a few degrees below the preset reference temperature.

It is to be appreciated that while a thermostat having a safety feature has been described for use with a furnace, the above described invention can also be incorporated into other types of heating or cooling systems. When utilizing this invention with a cooling system, however, a modification of the feedback loop created by the resistor 37 will be necessary. In such cases, the resistor 37 will still connect at one end to the collector of the transistor 15 but the other end of the resistor 37 will need to attach to the positive input terminal of the comparator 27. Additionally, it should be understood by those of ordinary skill in the art that various modifications may be made to the present invention without departing from the spirit or scope of the general inventive concept as defined by the appended claims and their equivalents.

What is claimed is:

1. A thermostat for controlling activation of a system for conditioning air, said thermostat comprising:

activating circuitry, connected to said system for conditioning air, for activating said system for conditioning air;

a controller connected to said activating circuitry, said controller generating a control signal to said activating circuitry so as to cause said activating circuitry to activate said system for conditioning air; and shunting circuitry operatively connected to said activating circuitry, for shunting the control signal generated by said controller when a predetermined temperature occurs in the space being heated or cooled by said system for conditioning air.

2. The thermostat of claim 1 wherein said activating circuitry includes:

circuitry for transmitting a predefined signal level activating said system for conditioning air; and a switching transistor connected to said signal transmitting circuitry for switching the signal level on or off in response to the control signal from said controller.

3. The thermostat of claim 1 further comprising:

temperature responsive circuitry which is operative to maintain a signal to said shunting circuitry which is indicative of the temperature in the space being heated or cooled.

4. The thermostat of claim 3 wherein said shunting circuitry comprises:

a comparator connected to said temperature sensitive circuitry so as to receive the signal from said temperature sensitive circuitry, said comparator being furthermore operatively connected to reference voltage circuitry defining a threshold voltage level whereby said comparator is operative to trigger the shunting of said control signal from said controller when the signal from said temperature sensitive circuitry passes through the threshold voltage level.

5. The thermostat of claim 4 wherein said reference voltage circuitry comprises:

a feedback circuit connected to said activating circuitry for feeding back the voltage level condition of said activating circuitry so as to change the threshold voltage level following the shunting of the control signal from said controller.

6. The thermostat of claim 1 wherein said controller comprises a programmable microprocessor generating a bilevel control signal normally triggering said activating circuitry at a given signal level.

7. The thermostat of claim 6 wherein said shunting circuitry comprises:

bilevel signal alteration circuitry operatively connected to said controller for changing the signal level of said bilevel signal from said microprocessor before the bilevel signal is applied to said activating circuitry whereby said activating circuitry is switched off.

8. A method for controlling a system for conditioning air comprising the steps of:

sensing the temperature of a space being heated or cooled with a temperature sensor;

normally activating the system for conditioning air by at least one control signal when the sensed temperature varies from a setpoint temperature; and shunting the control signal normally activating said system for conditioning air when the sensed temperature from said temperature sensor reaches a predetermined temperature value.

9. The method of claim 8 wherein said step of sensing the temperature of the space being heated or cooled with a temperature sensor comprises the step of:

using a thermal resistor to produce a temperature signal representative of said sensed temperature.

10. The method of claim 9 wherein said step of shunting the control signal comprises the steps of:
   comparing said temperature signal to the predetermined temperature value; and
   shunting the control signal when the temperature signal passes through the predetermined temperature value.

11. The method of claim 8 wherein said step of shunting said control signal comprises the steps of:
   driving an output of a comparator low; and
   switching a transistor off when the output of the comparator goes low, the transistor otherwise being controlled by the control signal used to activate or deactivate the system for conditioning air.

* * * * *